United States Patent [19]

Dholakia

[11] Patent Number: 4,766,705
[45] Date of Patent: Aug. 30, 1988

[54] METHOD FOR POLISHING THE END OF AN OPTICAL FIBER

[75] Inventor: Anil R. Dholakia, East Windsor, N.J.

[73] Assignee: RCA Corporation, Princeton, N.J.

[21] Appl. No.: 469,736

[22] Filed: Feb. 25, 1983

[51] Int. Cl.⁴ .............................................. B24B 1/00
[52] U.S. Cl. .................... 51/328; 51/283 R; 65/4.1; 65/102
[58] Field of Search .................. 51/328, 326, DIG. 5, 51/DIG. 17, 283 R, 283 E, 284 R, 284 E, 324; 65/4.1, 10.2, 102, 112

[56] References Cited

U.S. PATENT DOCUMENTS

| | | |
|---|---|---|
| 575,870 | 1/1897 | Beers . |
| 2,105,612 | 1/1938 | Pallas .................................... 51/71 |
| 2,700,259 | 1/1955 | Dreyfus ................................ 51/328 |
| 2,706,876 | 4/1955 | Levengood ....................... 51/283 E |
| 2,714,278 | 8/1955 | Dostert ................................. 51/137 |
| 3,069,815 | 12/1962 | Valentine ............................. 51/328 |
| 3,427,764 | 2/1969 | Draving ............................... 51/324 |
| 3,626,644 | 12/1971 | Cupler, II ............................ 51/288 |
| 3,852,922 | 12/1974 | Grieco ............................... 51/218 A |
| 3,864,018 | 2/1975 | Miller .................................... 65/4.1 |
| 4,130,343 | 12/1978 | Miller et al. ...................... 350/96.17 |
| 4,285,170 | 8/1981 | Bardsley ............................... 51/324 |

FOREIGN PATENT DOCUMENTS 0156159  9/1982  Japan ................................. 51/283 R

OTHER PUBLICATIONS

"Peaked Fiber Ends Result in Increased Coupling Efficiency" Laser Focus, Feb. 1982.
"Electrostatic Bonding of Silicon and Glass Forms Rugged Connector", Fiberscan, Feb. 1982.

Primary Examiner—Frederick R. Schmidt
Assistant Examiner—Robert A. Rose
Attorney, Agent, or Firm—Marvin Snyder; Fred Jacob; Harley R. Ball

[57] ABSTRACT

A method of polishing a roof-shaped, or bevelled, tip having a predetermined angle on the end of an optical fiber is disclosed. The method comprises placing an optical fiber in contact with an abrasive tape at an angle corresponding to the desired predetermined angle. The fiber is moved towards the tape beyond the point of contact so as to cause a bend in the fiber. Upon moving the abrasive tape, the compliance of the fiber, by virtue of the bend, provides a pressure of the fiber against the tape to enable polishing to occur. As polishing continues the pressure decreases until enough material is removed so as to eliminate the bend and impart the predetermined angle to the fiber tip. The fiber may be rotated to polish the other side in a similar manner, if so desired.

6 Claims, 2 Drawing Sheets

METHOD FOR POLISHING THE END OF AN OPTICAL FIBER

INTRODUCTION

The invention described herein was made in the performance of work under NASA Contract No. NAS 1-15440 and is subject to the provisions of Section 305 of the National Aeronautics and Space Act of 1958 (72 Stat. 435; 42 U.S.C. 2457.

The present invention relates to a method for imparting a predetermined shape or angle onto the end of an optical fiber to be used in transmitting light signals. More particularly, the invention concerns a method ior imparting a roof-shaped tip on the end of such a fiber.

BACKGROUND OF THE INVENTION

The employment of optical fibers for the transmission of information-bearing light signals is an established art. Of primary concern is the efficient coupling of the light from a semiconductor source, such as a laser or a light-emitting diode (LED), into the end of a fiber.

A recent scheme for enhanced laser-to-fiber coupling includes imparting a roof-shaped tip onto the end of a fiber, which roof-shaped tip not only increases the amount of light coupled into the fiber, but further reduces the damaging effects of light reflected back to the source.

Another coupling arrangement was disclosed in U.S. Pat. No. 4,130,343 to Miller et al. This invention addressed the packaging problems in systems which sought to couple light from an LED into a fiber. In this case, a bevel of a certain angle had to be polished onto the end of the fiber.

In the manufacture of these tips onto the end of an optical fiber, it is crucial to maintain good control of the angle of the tip. Further, it is important to produce optically flat, defect-free surfaces to the tip for maximum coupling efficiency and protection against reflected light. It may be necessary to change abrasives during the polishing steps, so as to finish up with a mild abrasive to obtain the smoothest possible surfaces on the fiber tip. Typically, the fiber is held rigid in a fixture in order to accurately polish the desired shape on the tip. However, the fiber end to be polished, which necessarily extends a slight amount beyond the fixture, can be damaged by shock or vibration upon contact with an abrasive, causing chips in the sides of the tip. Chips, or other defects larger than 0.1 micrometer in size are undesirable for efficient coupling.

Therefore, a method to polish a roof-shaped or bevelled tip onto the end of an optical fiber, which provides accuracy and simplicity, as well as optically flat, defect-free surfaces has been sought.

SUMMARY OF THE INVENTION

A method of polishing a roof-shaped, or bevelled, tip having a predetermined angle on the end of an optical fiber is disclosed. The method comprises placing an optical fiber in contact with an abrasive tape at an angle corresponding to the desired predetermined angle. The fiber is moved towards the tape beyond the point of contact so as to cause a bend in the fiber. Upon moving the abrasive tape, the compliance of the fiber, by virtue of the bend, provides a pressure of the fiber against the tape to enable polishing to occur. As polishing continues the pressure decreases until enough material is removed so as to eliminate the bend and impart the predetermined angle to the fiber tip. The fiber may be rotated to polish the other side in a similar manner,

DRAWINGS

DETAILED DESCRIPTION OF THE INVENTION

The present invention will be described with regard to imparting a roof shape of predetermined angle of intersection to the end of an optical fiber. It should be apparent, however, that the method of the present invention adapts readily to polishing a bevel of predetermined angle on the end of a fiber as well.

Figure 1:
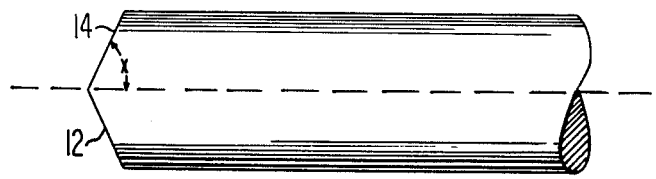
FIG. 1 shows an optical fiber whose end has been polished to a roof-shaped tip.

The present invention will now be described with reference to the FIGURES. FIG. 1 shows an optical fiber generally as 10, one end of which has been polished to a roof-shape. One side 12 of the roof shape is polished first at the predetermined angle x. The fiber 10 is then rotated 180° to similarly polish the other side 14.

Figure 2:
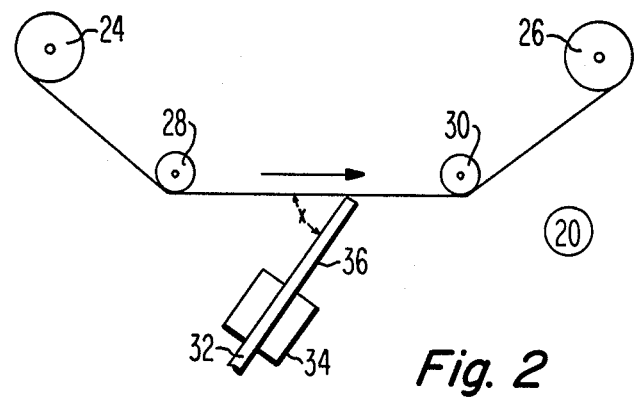
FIG. 2 illustrates a suitable apparatus for practicing the method of the present invention.

An apparatus suitable for practicing the present invention is shown in FIG. 2 as 20. An abrasive tape 22, such as silicon carbide bonded to a polyesterfilm, is pulled from a feed spool 24 to a take-up spool 26 by means (not shown) for rotating the take-up spool 26. Between, but not in direct alignment with, spools 24 and 26, are posts 28 and 30 which serve to keep the tape 22 in tension for more smooth and accurate polishing. A standard reel-to-reel audio tape deck is easily adapted for use in the present method. The optical fiber 32 to be polished is mounted in a fixture 34 which can be adjusted to introduce the fiber 32 to the tape 22 at the predetermined angle x. The fixture 34 must also have the capability of being moved perpendicularly with regard to the tape 22. A "free length" of the fiber 32 extends beyond the fixture 34 for successful operation according to the present invention.

Figure 3:
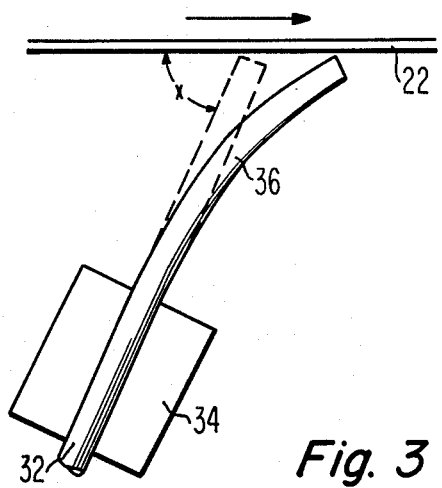
FIG. 3 illustrates the fiber in relation to the abrasive tape at the outset of polishing.
Figure 4:
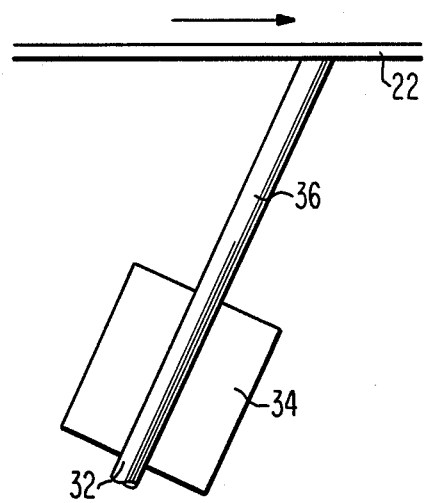
FIG. 4 illustrates the relationship of FIG. 3 after polishing one side of the fiber.

To accomplish the polishing of a roof-shaped tip onto the end of a fiber 32 in accordance with the present invention, we now refer to FIG. 3. The fixture 34 holding the fiber 32 with a free length 36 extending beyond the fixture 34, and which is aligned at the predetermined angle x, is moved perpendicularly closer to the tape 22 until the free length 36 bends. The fixture 34 is now locked into this position. The take-up spool 26 is rotated by the rotating means (not shown) to move the abrasive tape 22 from the feed spool 24 across the guide posts 28 and 30. The direction of the motion of the tape 22 is shown by the arrow. The bend in the fiber 32 creates a pressure of the fiber 32 against the abrasive tape 22 corresponding to the compliance or stiffness of the fiber 32. As the abrasive tape 22 removes material from the end of the fiber 32, the fiber 32 becomes shorter and the bend tends to relax which decreases the pressure as the polishing proceeds. As shown in FIG. 4, when enough material has been removed from the fiber 32 it straightens out which achieves two goals paramount to the present invention. First, the end of fiber 32 is now at the predetermined angle x in order that this angle x may now be imparted to the fiber 32. Secondly, the polishing pressure which is governed by the amount of bend in the free length 36 of the fiber 32 is now minimal which ensures a smooth finish on the tip of the fiber 32. The fixture 34 can now be rotated 180° to polish the other side of the fiber 32 in a similar manner.

The above-described method provides accurate, defect-free polishing of the end of an optical fiber with the benefit of adjustable polishing force, in a simplistic, efficient, reproducible manner without the need for user polishing-force adjustments or for changing abrasives.

The present invention will now be described in the following example; however, it is to be understood that the invention is not meant to be limited by the details described therein.

EXAMPLE

A 3 micrometer particle silicon carbide abrasive tape, commercially available from the 3M Corporation, was mounted onto the reels and across the guide posts of a standard reel-to-reel audio tape deck. A length of a DWF graded index, multi-mode glass optical fiber, commercially available from Dow Corning Corporation, was mounted in an aluminum clamping fixture. The fixture was aligned so that it held the fiber at an angle of 65° with reference to the abrasive tape stretched across the guide posts of the tape deck. A "free length" of about 2.5 centimeters of fiber was permitted to extend beyond the end of the fixture and this "free length" was stripped of its plastic coating to expose a 140 micrometer diameter glass fiber. The fixture was moved perpendicularly closer to the tape a distance sufficient to cause a bend in the fiber. The tape deck was switched on. The abrasive tape reeled up at about 19 centimeters per second. The polishing was continued for 30 minutes. At this point, the tape deck was stopped and the fiber was rotated 180°. The process was repeated for another 30 minutes on the opposite side of the fiber. The finished tip was a roof-shaped configuration, each side of which measured 65° from the center axis of the fiber. Further, the surfaces of the roof were optically flat and defect-free providing high coupling efficiency of laser light.

What is claimed is:

1. A method of imparting a defect-free, roof-shaped tip having a predetermined angle of intersection to the end of an optical fiber which comprises:
   (a) mounting a fiber in a fixture so that the end of the fiber extends beyond the fixture sufficiently to allow the fiber to bend;
   (b) mounting an abrasive, flexible lapping tape between take-up reels;
   (c) presenting the fixture and the end of the fiber to the abrasive tape between the take-up reels at said predetermined angle such that the fiber tip contacts the tape;
   (d) moving the fixture and fiber perpendicularly closer to the tape such that the fiber end bends against the tape while the remainder of the fiber is maintained at said predetermined angle;
   (e) lapping said fiber tip by establishing a relative motion between said fiber and said tape until the fiber end straightens out and the predetermined angle has been imparted to said fiber tip, whereby the force of the fiber end against the tape automatically decreases as the lapping continues and the fiber bend straightens; and,
   (f) rotating said fiber 180° and repeating steps (c), (d) and (e).

2. The method of claim 1 wherein the abrasive lapping tape comprises silicon carbide particles bonded to a polyester tape backing.

3. The method of claim 1 wherein the velocity of the abrasive tape is about 19 centimeters per second.

4. A method of imparting a defect-free bevelled tip having a predetermined angle to the end of an optical fiber which comprises:
   (a) mounting a fiber in a fixture so that the end of the fiber extends beyond the fixture sufficiently to allow the fiber to bend;
   (b) mounting an abrasive, flexible lapping tape between take-up reels;
   (c) presenting the fixture and the end of the fiber to the abrasive tape between the take-up reels at said predetermined angle such that the fiber tip contacts the tape;
   (d) moving the fixture and fiber perpendicularly closer to the tape such that the fiber end bends against the tape but where the rest of the fiber is maintained at said predetermined angle;
   (e) lapping said fiber tip by establishing a relative motion between said fiber and said tape, which lapping is continued until the fiber end straightens out such that the predetermined angle has been imparted to said fiber tip, and whereby the force of the fiber end against the tape automatically decreases as the lapping continues and the fiber bend straightens.

5. The method of claim 4 wherein the abrasive lapping tape comprises silicon carbide abrasive particles bonded to a polyester tape backing.

6. The method of claim 4 wherein the velocity of the abrasive tape is about 19 centimeters per second.

* * * * *